(No Model.)
A. RAMAGE.
CAM FOR STAMP MILLS.
No. 446,693. Patented Feb. 17, 1891.
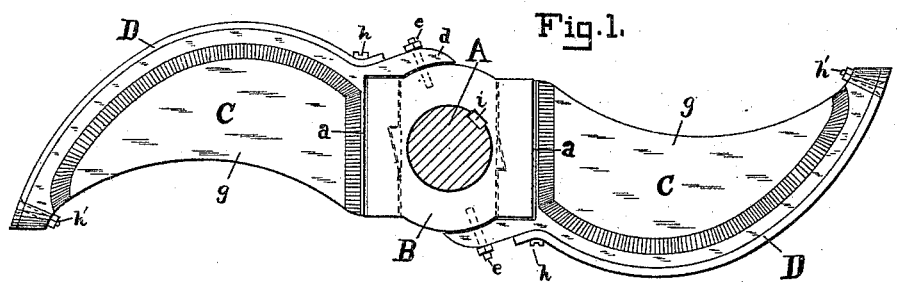
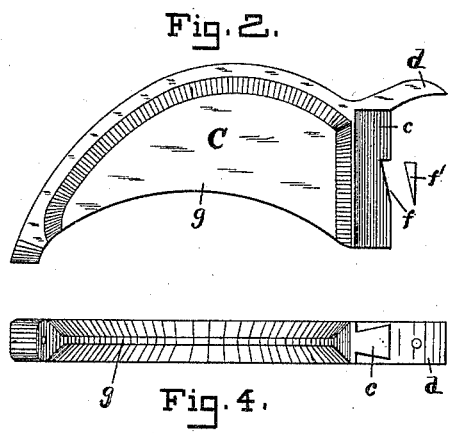
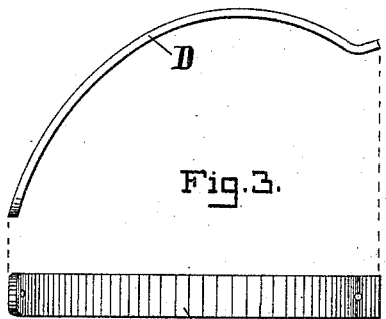
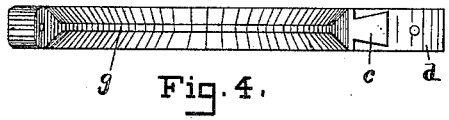
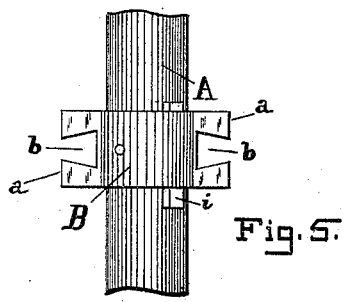
WITNESSES:
Otto H. Ehlers
J. P. Davis
INVENTOR:
Alexander Ramage
BY Chas B. Mann
ATTORNEY.

UNITED STATES PATENT OFFICE.

ALEXANDER RAMAGE, OF IDAHO SPRINGS, COLORADO.

CAM FOR STAMP-MILLS.

SPECIFICATION forming part of Letters Patent No. 446,693, dated February 17, 1891.

Application filed November 8, 1890. Serial No. 370,731. (No model.)

*To all whom it may concern:*

Be it known that I, ALEXANDER RAMAGE, a citizen of the United States, residing at Idaho Springs, in the county of Clear Creek and State of Colorado, have invented certain new and useful Improvements in Cams for Stamp-Mills, of which the following is a specification.

This invention relates to a removable cam for use in stamp-mills or other machines, in which the cam consists of one or more arms projecting from the hub mounted on the shaft.

The object of the invention is to provide a cheap and durable cam of such construction as to admit of being readily removed from the hub.

In the accompanying drawings, illustrating my invention, Figure 1 shows a side view of a cam-hub provided with two cam-arms. Fig. 2 is a side view of one cam-arm separate from the hub. Fig. 3 shows two views of the shoe. Fig. 4 is an edge view of the cam-arm. Fig. 5 is a view of the hub.

The letter A designates the revoluble driving-shaft; B, the cam-hub mounted thereon; C, the cam-arm attached to the said hub, but removable therefrom, and D the removable cam-shoe attached to the edge of the said cam-arm. The cam-hub B has two parallel straight faces $a$. (See Fig. 1.) Each face has a dovetail groove $b$ at right angles to the driving-shaft. Each of the cam-arms C has a dovetail slide shank $c$, which fits into the dovetail groove $b$ of the hub. At one end of the slide-shank is an arm $d$, which projects partly over the hub B, and a bolt or screw $e$ passes through a hole in the said arm $d$ and into the hub B, and thus secured prevents the slide-shank of the cam-arm from shifting in the dovetail groove $b$. The slide-shank has a notch or shoulder $f$ in its inner edge for the reception of a piece of soft wood $f'$, rubber or other suitable material, which prevents the cam-arm C from rattling while in motion. A strengthening-rib $g$ extends the entire length of the cam-arm. It will be seen that by the above construction the cam-arm C may be easily removed from the hub B without disturbing the position of the latter on the driving-shaft by merely removing the screw $e$ from the hub B and drawing the slide-shank $c$ from the dovetail groove $b$ of the hub. Each of the cam-arms C has a removable metal shoe D, which is fastened by means of a screw $h$ at one end and a bolt $h'$ at the other. The head of the bolt is countersunk into the shoe so as to leave a smooth cam-surface. The shoe may be easily removed from the cam-arm. The cam-shoe D just referred to may be entirely dispensed with, if desired; but its use saves wear direct on the cam. The hub B is secured to the shaft by a key $i$ or other suitable means, and this need not be removed should it become necessary to detach the cam-arms or either of them.

Having described my invention, I claim—

1. In a cam for stamp-mills or other machines, the combination of the hub B, provided with a dovetail-groove $b$, a cam-arm C, having a slide-shank $c$ to enter the said dovetail groove $b$ of the hub, and means to fasten the arm, as and for the purpose set forth.

2. In a cam for stamp-mills or other machines, the combination of the hub B, provided with a dovetail groove $b$, a cam-arm C, having a slide-shank $c$ to enter the said dovetail groove $b$ of the hub, and an arm $d$, projecting from the cam-arm and fastened to the hub, as and for the purpose set forth.

3. In a cam for stamp-mills or other machines, the combination of the hub B, provided with a dovetail groove $b$, a cam-arm C, having a slide-shank $c$ to enter the said dovetail groove $b$ of the hub, said slide-shank having on its edge a notch or shoulder for the reception of a piece of wood or other material, and an arm $d$, projecting from the cam-arm and extending to and upon the hub and fastened thereto.

4. The combination of the driving-shaft, a hub secured on the shaft and having two parallel faces, each provided with a dovetail groove $b$ at right angles to the shaft, cam-arms C, each having a slide-shank $c$ to enter the said dovetail grooves of the hub, and means to fasten the arms, as and for the purpose set forth.

In testimony whereof I affix my signature in the presence of two witnesses.

ALEXANDER RAMAGE.

Witnesses:
 H. A. TWINING,
 DANIEL DOYLE.